(12) United States Patent
Yoshida

(10) Patent No.: US 6,895,331 B2
(45) Date of Patent: May 17, 2005

(54) NAVIGATION DEVICE AND METHOD

(75) Inventor: Ryo Yoshida, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 197 days.

(21) Appl. No.: 10/200,042

(22) Filed: Jul. 19, 2002

(65) Prior Publication Data

US 2003/0023375 A1 Jan. 30, 2003

(30) Foreign Application Priority Data

Jul. 25, 2001 (JP) ........................................ 2001-224538

(51) Int. Cl.$^7$ ............................ G06F 19/00; G06F 7/00
(52) U.S. Cl. ...................... 701/212; 701/202; 701/209; 340/990; 340/995.11; 340/995.2
(58) Field of Search ................................ 701/201, 200, 701/210, 202, 208, 212, 209; 340/990, 995.2, 995.21, 995.1, 995.11, 995.23; 455/456.5

(56) References Cited

U.S. PATENT DOCUMENTS

| | | | | |
|---|---|---|---|---|
| 5,787,383 A | * | 7/1998 | Moroto et al. .............. | 701/210 |
| 5,802,492 A | * | 9/1998 | DeLorme et al. ......... | 455/456.5 |
| 6,061,629 A | | 5/2000 | Yano et al. .................. | 701/209 |
| 6,067,502 A | * | 5/2000 | Hayashida et al. ......... | 701/209 |
| 6,101,443 A | * | 8/2000 | Kato et al. .................. | 701/210 |
| 2003/0197626 A1 | * | 10/2003 | Endo et al. .............. | 340/995.1 |

* cited by examiner

Primary Examiner—Thomas G. Black
Assistant Examiner—Ronnie Mancho
(74) Attorney, Agent, or Firm—Brinks Hofer Gilson & Lione

(57) ABSTRACT

A navigation device is provided for easily designating a road to be avoided with high accuracy. When a location on a map is designated by a touch panel 7, an avoidance-road setting unit 22 identifies a road existing at or near the location designated, and specifies a link corresponding to the road. Then a map drawing unit 14 draws a map image in a reduced scale larger than that previously set. If another location on the map is designated, the process of specifying the link and the process of drawing the map image in the larger reduced scale, which are described above, are repeated. When there is provided an instruction to set the road specified based on the location as an avoidance road, the avoidance-road setting unit 22 stores a link ID of the link corresponding to the specified road in an avoidance-road memory 24.

16 Claims, 11 Drawing Sheets

FIG. 8

| LINK ID | REGISTERED DAY | ADDITIONAL INFORMATION |
|---------|----------------|------------------------|
| Ln20 | 2001. 6. 25 | ○○ STREET (UNDER CONGESTION) |
| Ln41 | 2001. 6. 28 | △△ STATION ROAD (UNDER CONGESTION) |
| Ln55 | 2001. 7. 15 | ○△ MAIN ROAD (UNDER CONSTRUCTION) |
| ⋮ | ⋮ | ⋮ |

NAVIGATION DEVICE AND METHOD

BACKGROUND OF THE INVENTION

1. Field of the Invention

The present invention relates to a navigation device that has a route search function of searching for a guidance traveling route connecting a predetermined starting point with a destination and, more specifically, a function of designating an arbitrary road included in a map image in accordance with a user's operation.

2. Description of the Related Art

Generally, vehicle navigation devices are designed to have various functions, such as a map display function of displaying a map image covering a present position of a vehicle and its surroundings on a screen, a route search function of searching a guidance traveling route to the destination or a pass-through location, which is designated by a user, and a route guiding function of guiding the vehicle according to the guidance route obtained by the route search.

Upon performing the route search to the desired destination using the aforesaid route search function, there are cases where the occurrence of an accident or traffic congestion on a specific road has been known in advance. In such cases, a guidance traveling route bypassing the specific road is required by the user. In order to meet such a request, there has been proposed various methods for the route search.

For instance, a first known type of route search method (hereinafter referred to as the "first prior art") comprises the steps of searching for a guidance traveling route to the destination; displaying a traveling route list which includes the contents of the guidance traveling route, that is, the names of intersections at which the vehicle turns, and the names of roads between the intersections (for example, Route No. of the National Road, and so on); selecting a road to be bypassed from this traveling route list; and performing another route search for a guidance route which bypasses the selected road, to provide a new or revised guidance route.

Further, a second known type of route search method (hereinafter referred to as the "second prior art") comprises the steps of designating a predetermined area (for example, a rectangular region) including an avoidance road on the map; and searching for a guidance traveling route with all the roads in the predetermined area set as objects not to be searched.

Moreover, a third known method of searching for a guidance traveling route which bypasses a specific road (hereinafter referred to as the "third prior art") comprises the steps of designating a location to be avoided on a map; setting a road existing near the location as an object to be avoided, to perform a route search.

In addition, a fourth known method of searching for a guidance traveling route which bypasses a prescribed road (hereinafter referred to as the "fourth prior art") comprises the steps of performing a route search; designating two locations on a guidance traveling route obtained by the route search; setting an interval between the two locations as an object to be avoided, to carry out another route search.

In the navigation device employing the first prior art described above, the avoidance road is selected from the roads which are divided from one another by the intersections where the vehicle turned. Thus, this navigation device has suffered from inflexibility in the selection of the avoidance road. In other words, in a case where a section to be avoided is short, this navigation device cannot select and bypass this section only, and probably selects a road which has a longer distance than required as the avoidance road, thereby failing to set the avoidance road or section with high accuracy.

Similarly, the navigation device employing the second prior art described above sets all the roads included in the predetermined area as the avoidance roads or sections. Even in a case where only a few roads are to be avoided, more roads than necessary are probably selected to be bypassed, thus making it impossible to set the avoidance road or section accurately.

In the navigation device employing the above-mentioned third prior art, the road near the designated location is specified by a predetermined unit as the avoidance road. The range of the predetermined unit as the avoidance road is difficult for the user to understand, resulting in a disadvantage that the avoidance road cannot be defined in accordance with the user's intention with high accuracy.

The navigation device employing the above-mentioned fourth prior art is designed to designate an avoidance road after displaying a map image with a wide display area including an overall guidance traveling route. In order to designate the avoidance road to a detailed degree, the user must adjust a reduced scale and a display area of the map image so as to display the map image including the avoidance road in the optimal reduced scale. This adjustment involves complicated operation.

The present invention has been accomplished in view of the above-mentioned technical background, and it is an object of the present invention to provide a navigation device that can easily designate the road to be avoided with high accuracy.

SUMMARY OF THE INVENTION

To solve the foregoing problems, in a navigation device according to the present invention, a map drawing means draws a map image in a predetermined reduced scale, and a display unit displays the map image drawn by the map drawing means. A designation means designates an arbitrary road which is included in the map image displayed by the display unit in compliance with a user's operation. A road selection means variably sets a range or section of the road designated by the designation means responsive to the reduced scale to select the road corresponding to the set range. This navigation device, when designating the arbitrary road included in the displayed map image, permits the variable setting of the range to be selected from the entire designated road in accordance with the reduced scale, to thereby facilitate designating the avoidance road or section with high accuracy.

Preferably, the navigation device further comprises selected-road storage means for storing the road or section selected by the aforesaid road selection means, irrespective of regular navigation processing. In a case where there are some roads to be usually bypassed (for instance, a road under constant traffic congestion, a road under construction over an extended time period, and so on), the selected-road storage means can store information on these roads, so that the readout of only the stored roads makes it possible to designate the avoidance road or section in future navigating operations, thus simplifying the navigating operation.

Also, the navigation device preferably comprises route search means for searching for an optimal traveling route between a predetermined starting point and a destination, and avoidance setting means for setting the road or the section thereof selected by the road selection means to be avoided when the route search is performed by the route search means. This can provide a guidance traveling route which bypasses the selected road or the selected section of the road.

As to roads which are respectively included in a plurality of map images responsive to a plurality of reduced scales, the roads being identical to one another, the road in the higher-order map image having the smaller reduced scale corresponds to a longer link, while the identical road in the lower-order map image having the larger reduced scale corresponds to smaller links into which the longer link is divided. In such cases, when the designation means designates the road in the map image having any one of the reduced scales, the above avoidance setting means preferably sets a first link corresponding to the designated road, and a plurality of second links in the lower-order map image corresponding to the first link, as avoidance links of interest. When the set intervals of the links are different from each other depending on the reduced scales of the map images, the avoidance setting means sets the respective links in the higher-order map image and in the lower-order map image corresponding to the designated road as the avoidance links of interest, to thereby define with certainty the avoidance road or the avoidance section thereof.

The above map drawing means, in a case where a part of the road selected by the road selection means lies outside a display area on the display unit, may draw the map image again such that a full range of the selected road is within the display area. This facilitates understanding the full range of the selected road.

Also, the map drawing means may draw the road selected by the road selection means in such a manner that the selected road is distinguishable from the other road(s) displayed. This permits distinguishing the selected road from the others with ease.

Preferably, the map drawing means draws a detailed area map image in a reduced scale larger than the reduced scale which is set when the road selection means selects any one of the roads. When the designation means carries out a repeated designation of a road, the road selection means performs a selecting operation of a detailed road, based on the road that has been already selected. In short, after the selection of the road is made, the detailed area map image is displayed in the larger reduced scale, and when the repeated designation of the road is made, the selecting operation of the detailed road or section is performed for the previously selected road. According to this navigation device, for setting the avoidance road or section in detail, the user does not need to adjust the reduced scale of the map by himself, thereby improving the operability thereof.

When the road selection means repeatedly performs a plurality of road selecting operations, the map drawing means preferably draws each of the roads selected by the respective selecting process in such a manner that the selected roads are distinguishable from one another and from the other road(s) displayed. This allows the user to understand the selected road or section much more easily.

In addition, when the designation means designates an expressway, the road selection means may select the entire designated expressway in a case where the reduced scale is smaller than a predetermined value, and partially selects a section from the expressway with an interval from one interchange of the designated expressway to another as one unit in a case where the reduced scale is larger than the predetermined value. Thus, depending on the reduced scale, it is possible to select the entire expressway, or to select a section of the expressway with the interval between interchanges as one unit, as the avoidance object, thereby improving the operability of the navigation device. In particular, this navigation device permits a selection of the section of the expressway with the interval between interchanges as one unit, whereby in case of a traffic accident on the expressway, the section including the location of the traffic accident can be easily set as the avoidance area.

BRIEF DESCRIPTION OF THE DRAWINGS

FIG. 8 is a diagram showing one example of the contents of data stored in an avoidance-road memory.

DESCRIPTION OF THE PREFERRED EMBODIMENTS

A navigation device according to one preferred embodiment of the present invention will be described in detail hereinafter with reference to the drawings.

(1) Overall Construction of Navigation Device

Figure 1:
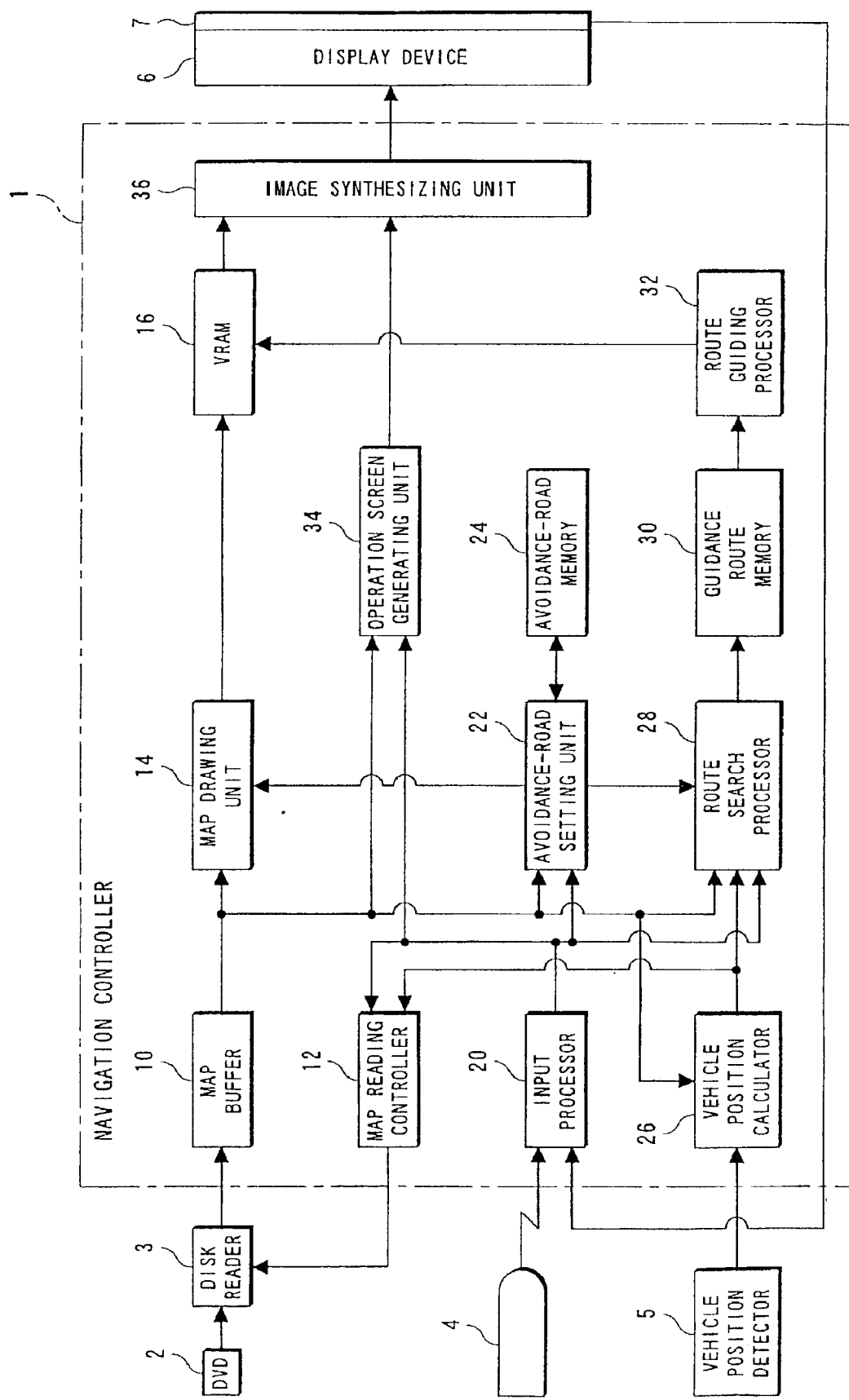
FIG. 1 is a block diagram showing the general construction of a navigation device in accordance with one preferred embodiment of the present invention.

FIG. 1 is a block diagram showing the general construction of the navigation device according to the present embodiment. Referring now to FIG. 1, the navigation device includes a navigation controller 1, a DVD 2, a disk reader 3, a remote control unit 4, a vehicle position detector 5, a display device 6, and a touch panel 7.

The navigation controller 1 controls the overall operation of the navigation device. This navigation controller 1 executes specific operating programs through the use of a CPU, a ROM, a RAM, and the like, to achieve its function. The detailed configuration of the navigation controller 1 will be described later.

The DVD 2 is an information storage medium that stores map data necessary for a map display, a route search or the like.

The disk reader 3 has one or more of the DVDs 2 loaded, and reads out the map data from any one of the DVDs 2 under the control of the navigation controller 1. A disk to be loaded is not necessarily a DVD, but may be a CD. The disk reader 3 may also selectively have a DVD and a CD loaded thereon.

The remote control unit 4 has various kinds of operating keys such as a joy stick for designating the vertical and horizontal directions, a ten-digit keypad, and a determination key for determining various settings. The remote control unit 4 transmits a signal responsive to an operating instruction provided by the operating keys to the navigation controller 1.

The vehicle position detector 5 includes, for example, a satellite global positioning system (GPS) receiver, an angle sensor, a range sensor and the like. The vehicle position detector 5 detects the present vehicle position (longitude, latitude) at a predetermined timing to provide a detected result.

The display device 6 displays various types of images such as a map image covering the present vehicle position and its surroundings, based on drawing data provided from the navigation controller 1.

Like the remote control unit 4, the touch panel 7 is for the user to enter various instructions. This touch panel 7 is attached to the front surface of the display screen of the display device 6, and detects a point on the screen of the display device 6 that is designated by the user, to provide a detected-position signal indicative of a detected position to the navigation controller 1.

(2) Detailed Contents of Map Data

Next, the detailed contents of the map data will be described. The map data stored in the DVD 2 includes (1) a "drawing unit" composed of various data necessary for the display of the map image, (2) a "road unit" composed of various data necessary for the processes of map matching, route searching, route guiding, and the like, and (3) an "intersection unit" composed of various data indicative of detailed data on the intersections. In the map data, the road data is described by use of nodes corresponding to the intersections and links connecting these nodes, and various genres regarding the roads and the intersections are linked to and stored with these nodes and links.

Figure 2:
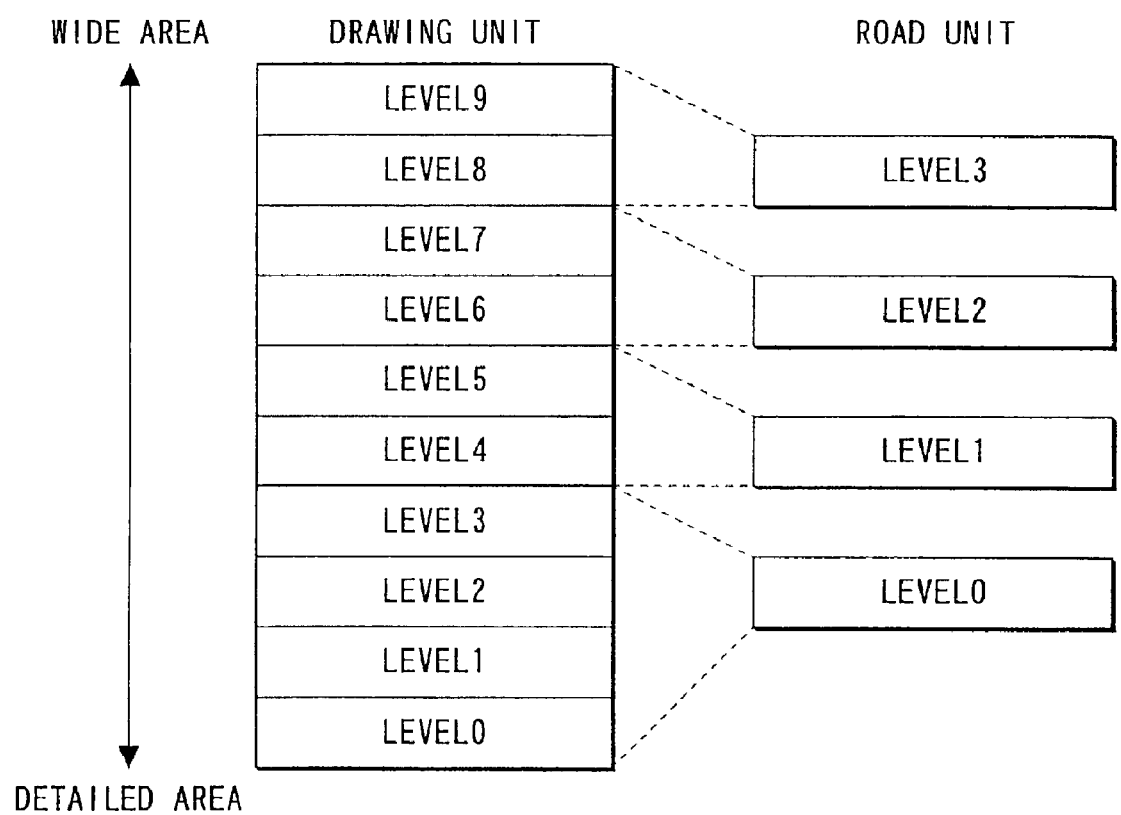
FIG. 2 is a diagram showing the relationship between a drawing unit and a road unit which are included in map data.

FIG. 2 is a diagram showing the relationship between the drawing unit and the road unit, which are included in the map data. The drawing unit that is used to draw the map image is hierarchically organized in relation to a plurality of reduced scales. In an example as shown in FIG. 2, the drawing unit is arranged in the hierarchical format having 10 levels, namely, the levels from "level 0" to "level 9". In accordance with the reduced scale of the map image designated by the user's instruction, the drawing unit having one of these levels is used to draw the map image. For instance, the "level 0" of the drawing unit corresponds to the largest reduced scale to be used for drawing the detailed map image, while the "level 9" of the drawing unit corresponds to the smallest reduced scale to be used for drawing the wide-area map image.

The road unit used for the route search and the like is hierarchically organized in accordance with the road types (for example, expressway, national road, and so on) to be recorded as data. In the example shown in FIG. 2, the road unit is arranged in the hierarchical format having 4 levels, namely the levels from "level 0" to "level 3". As the road unit has the lower level, it includes the data for more road types of interest.

Referring to FIG. 2, the level number of the drawing unit and the level number of the road unit are related to each other. In addition, the links and the nodes included in the road unit are respectively provided with individual identification numbers (link ID, and node ID). Once the level number and the link ID of the road unit have been designated, the corresponding road in the drawing unit can be specified (in the form of line data as the background information). Conversely, designation of the road and the level number of the drawing unit can specify the level number and the link ID of the corresponding road unit.

Figure 3:
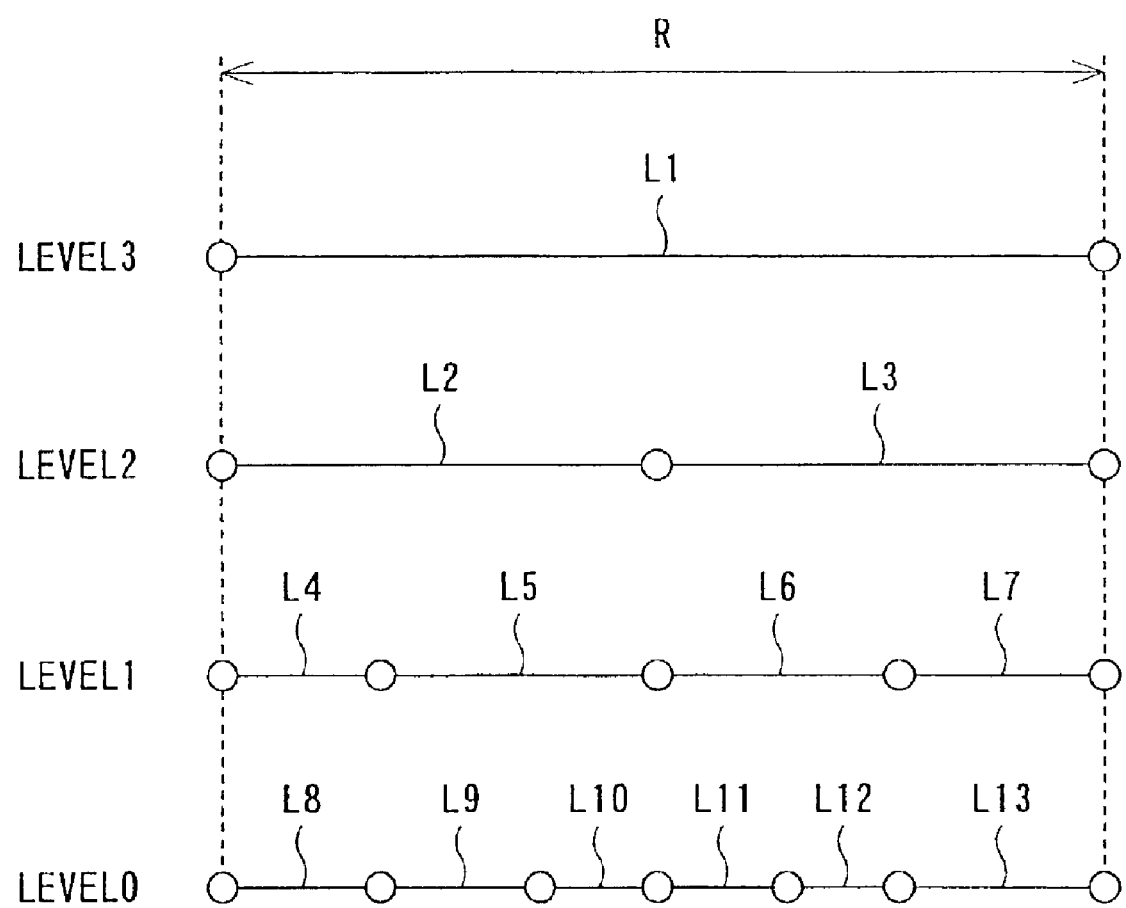
FIG. 3 is a diagram showing the relationship among level numbers, links, and nodes of the road unit.

FIG. 3 is a diagram showing the relationship among the level numbers, links, and nodes of the road unit. Specifically, with reference to this figure, assuming that the road having one section R is set, will be explained the contents of the links and the nodes corresponding to the section R which are set depending on the level number of the road unit.

In the "level 3" road unit, an interval between the nodes (in the figure, one node is described by one white circle), each of which corresponds to an intersection, is largest among those in the other levels. Therefore, the interval between these nodes, that is, the link set for the road R in the "level 3" road unit corresponds to a longer distance in comparison with the links set for the same road R in the other levels, namely, in the "level 0", "level 1", and "level 2" road units. As shown in FIG. 3, in the "level 3" road unit, the two nodes are set corresponding to the section R, and then the link L1 connecting these nodes is set. That is, the road within the section R is associated with one link L1.

In the "level 2" road unit, the set interval between the nodes is shorter than that in the "level 3" road unit. As shown in FIG. 3, there are provided three nodes corresponding to the section R, and two links L2 and L3 connecting these nodes.

In the "level 1" road unit, the set interval between the nodes is much shorter than that in the "level 2" road unit. As shown in FIG. 3, there are provided five nodes corresponding to the section R, and four links L4, L5, L6, and L7 connecting these nodes.

Similarly, in the "level 0" road unit, the set interval between the nodes is far shorter than that in the "level 1" road unit. As shown in FIG. 3, there are provided seven nodes corresponding to the section R, and six links L8, L9, L10, L11, L12, and L13 connecting these nodes.

As described above, as the level number of the road unit becomes smaller, the link in the road unit is set to have a shorter interval. Therefore, in a case where a road within the above section R is to be specified, when the "level 3" road unit is used corresponding to the "level 8" and "level 9" drawing units, the road is specified by the link L1 having a long interval. In contrast, when the "level 0" road unit is used, corresponding to the "level 0" to "level 3" drawing units, the road is specified by any one of links 8 to 13 each of which has a short interval.

(3) Detailed Configuration of Navigation Controller

Next, the detailed configuration of the navigation controller 1 will be described hereinafter. Referring to FIG. 1, the navigation controller 1 includes a map buffer 10, a map reading controller 12, a map drawing unit 14, a VRAM 16, an input processor 20, an avoidance-road setting unit 22, an avoidance-road memory 24, a vehicle position calculator 26, a route search processor 28, a guidance route memory 30, a route guiding processor 32, an operation screen generating unit 34, and an image synthesizing unit 36.

The map buffer 10 temporarily stores the map data read out of the DVD 2 by the disk reader 3.

The map reading controller 12 supplies to the disk reader 3 a request for the readout of the map data having a predetermined display area, in accordance with the present vehicle position calculated by the vehicle position calculator 26, an instruction from the input processor 20, and the like.

The map drawing unit 14 generates map drawing data for the display of the map image in a predetermined reduced scale, based on the map data stored in the map buffer 10.

The VRAM 16 temporarily stores the map drawing data provided from the map drawing unit 14.

The input processor 20 provides to each component of the navigation controller 1 orders for operation according to instructions given by the remote controller unit 4 or the touch panel 7.

The avoidance-road setting unit 22 sets a road to be avoided (hereinafter referred to as an "avoidance road") during the route search, that is, a road not to be considered when performing the route search based on the instruction provided by the touch panel 7. The contents of the avoidance road set by the avoidance-road setting unit 22 are stored in the avoidance-road memory 24. The operation of setting the avoidance road will be described in detail later.

Also, when the route search processor 28 carries out the predetermined route search processing, the avoidance-road setting unit 22 reads out the contents of the avoidance road stored in the avoidance-road memory 24, and provides to the route search processor 28 an instruction to bypass the avoidance road during the route search.

The vehicle position calculator 26 calculates the vehicle position and the traveling direction of the vehicle based on the detected data supplied by the vehicle position detector 5, and performs a map matching process to revise a calculated vehicle position when the calculated vehicle position is not on a road in the map data.

The route search processor 28 searches for a guidance route which connects the starting point and the destination or pass-through location which are designated by the user under a predetermined condition. The route search processor 28 of this embodiment performs the route search with the avoidance road set as an object not to be considered, based on the instruction from the avoidance-road setting unit 22.

The guidance route memory 30 stores guidance route data indicating the contents of the guidance traveling route extracted by the route search processor 28.

The route guiding processor 32 performs route guiding processing, which comprises the steps of reading out the guidance route data corresponding to the guidance traveling route from the guidance route memory 30, and generating drawing data for displaying the guidance traveling route (guidance route) superimposed on the map.

The operation screen generating unit 34 generates another other drawing data for displaying an operation screen as required for the user's various instructions.

The image synthesizing unit 36, as shown in FIG. 1, synthesizes the drawing data read from the VRAM 16 and the drawing data provided from the operation screen generating unit 34, and supplies the synthesized drawing data to the display device 6.

The aforesaid map drawing unit 14 corresponds to the map drawing means; the display device 6 to the display unit; the touch panel 7 and the input processor 20 to the designation means; the avoidance-road setting unit 22 to the road selection means and the avoidance setting means; the avoidance-road memory 24 to the selected-road storage means; and the route search processor 28 to the route search means.

(4) Operation of Navigation Device

Next, the operation of the navigation device of the embodiment having the above-mentioned configuration will be described hereunder.

Figure 4:
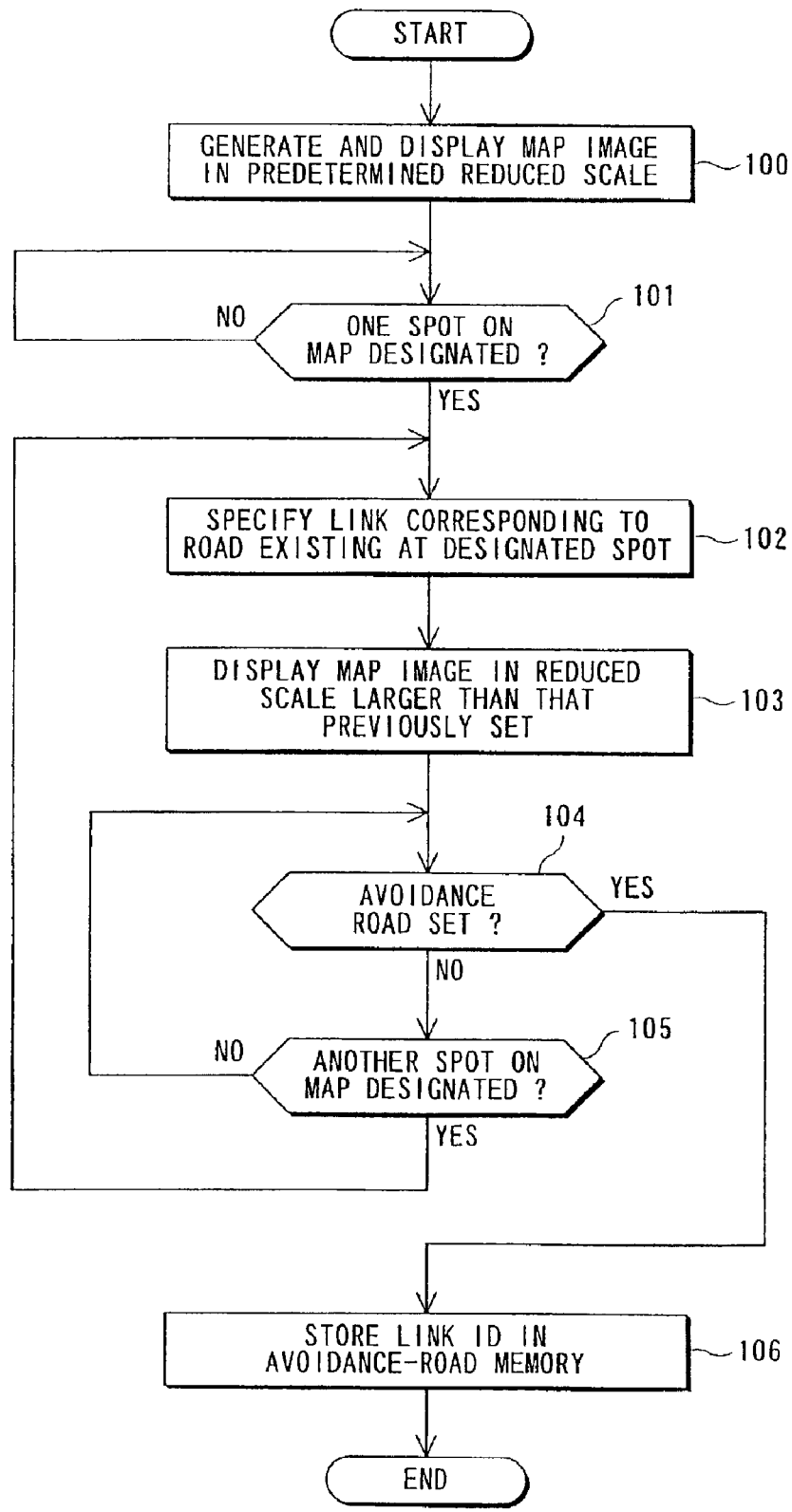
FIG. 4 is a flow chart showing the operation of the navigation device in setting an avoidance road.

FIG. 4 is a flow chart showing the operation of the navigation device in case of setting the avoidance road.

The map drawing unit 14 generates the map drawing data for displaying the map image in the predetermined reduced scale, responsive to a given location specified by the remote control unit 4 or the present vehicle position, and stores it in the VRAM 16. The map drawing data stored in the VRAM 16 is read out by the image synthesizing unit 36, so that the map image is displayed on the screen of the display device 6 (step 100).

Next, the avoidance-road setting unit 22 determines whether or not a location on the map is designated by the user's operation of the touch panel 7, based on signals provided from the input processor 20 (step 101). If no location is designated on the map, a negative determination is made and the processing in step 101 will be repeated.

When a location is designated on the map, an affirmative determination is made in step 101, and the avoidance-road setting unit 22 determines a road existing at the designated location or near the location, to specify a link corresponding to the road (step 102). In more detail, the avoidance-road setting unit 22 specifies the link by use of any one of the above "level 0" to "level 3" road units, in accordance with the reduced scale of the map image.

Then, the avoidance-road setting unit 22 provides to the map drawing unit 14 an instruction to draw a detailed area map image, that is, to re-draw a map image, in a reduced scale larger than that previously set. The map drawing unit 14, given the instruction, generates map drawing data in which the reduced scale is set larger than that previously set, while considering that the full range of the road corresponding to the link specified in step 102 is included in the display area, and then stores the generated map drawing data in the VRAM 16. The map drawing data stored in the VRAM 16 is read out by the image synthesizing unit 36, so that the detailed area map image is displayed on the screen of the display device 6 (step 103). An example of the above-mentioned map images will be explained later.

Next, the avoidance-road setting unit 22 determines whether or not the user has provided an instruction to set the road corresponding to the link specified in step 102 as the avoidance road (the road not to be searched) (step 104). Specifically, the above-mentioned setting operation is carried out by pressing a given SET button displayed on the screen of the display device 6, or by touching a predetermined part of the touch panel 7.

In a case where the instruction to set the avoidance road is not provided, a negative determination is made in step 104, and the avoidance-road setting unit 22 determines whether or not another location on the map is designated by the user (step 105). If another location is not designated on the map, a negative determination is made in step 105, and the process returns to step 104 to be repeatedly performed in the same way as described above.

When another location is designated on the map, an affirmative determination is made in step 105, and the process returns to step 102 to be repeatedly performed in the same way as mentioned above.

In a case where the instruction to set the avoidance road is provided, an affirmative determination is made above step 104, and the avoidance-road setting unit 22 stores a link ID of the link specified at that time into the avoidance-road memory 24 (step 106). The avoidance-road setting unit 22 of the embodiment, when storing the link ID indicative of the avoidance road, simultaneously stores data regarding the date and time (registered date) when the link ID is stored.

Also, in this embodiment, an arbitrary editing operation by the user permits storing of various types of additional information associated with the respective link IDs (which will be explained more specifically later).

Figure 5:
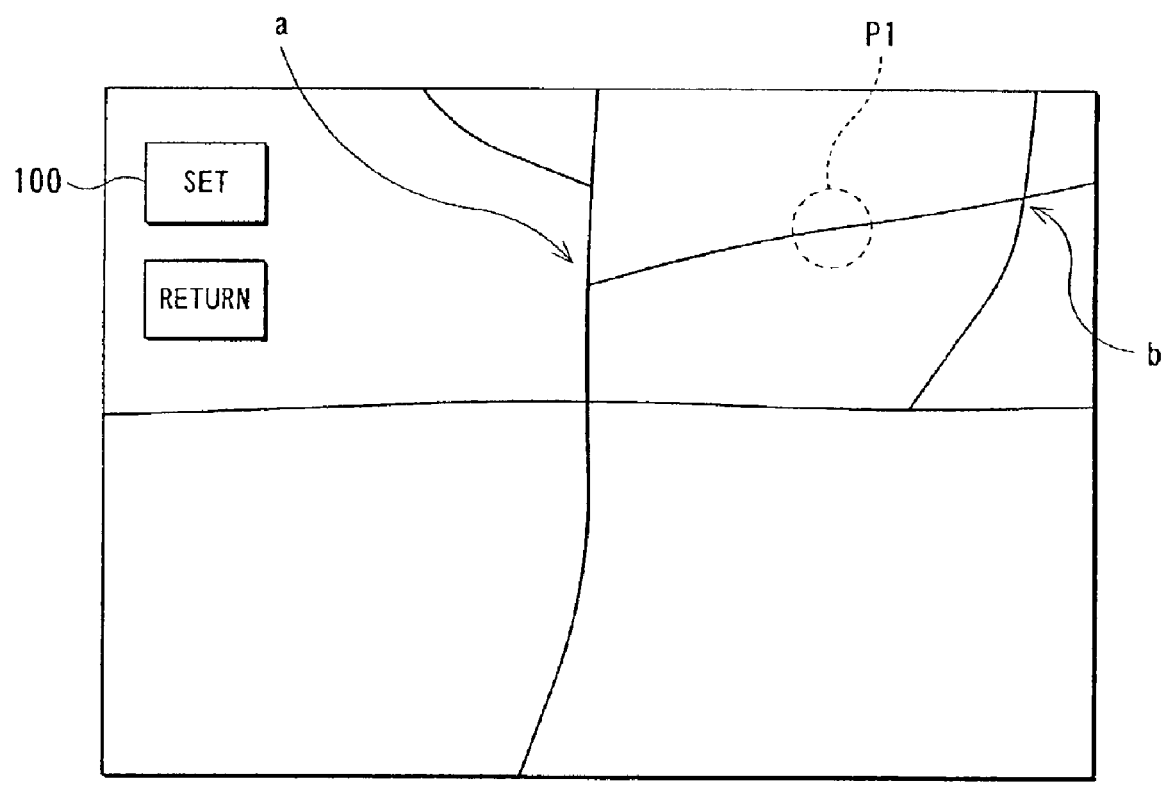
FIG. 5 is a diagram showing one example of the display of a map image when setting the avoidance road.
Figure 6:
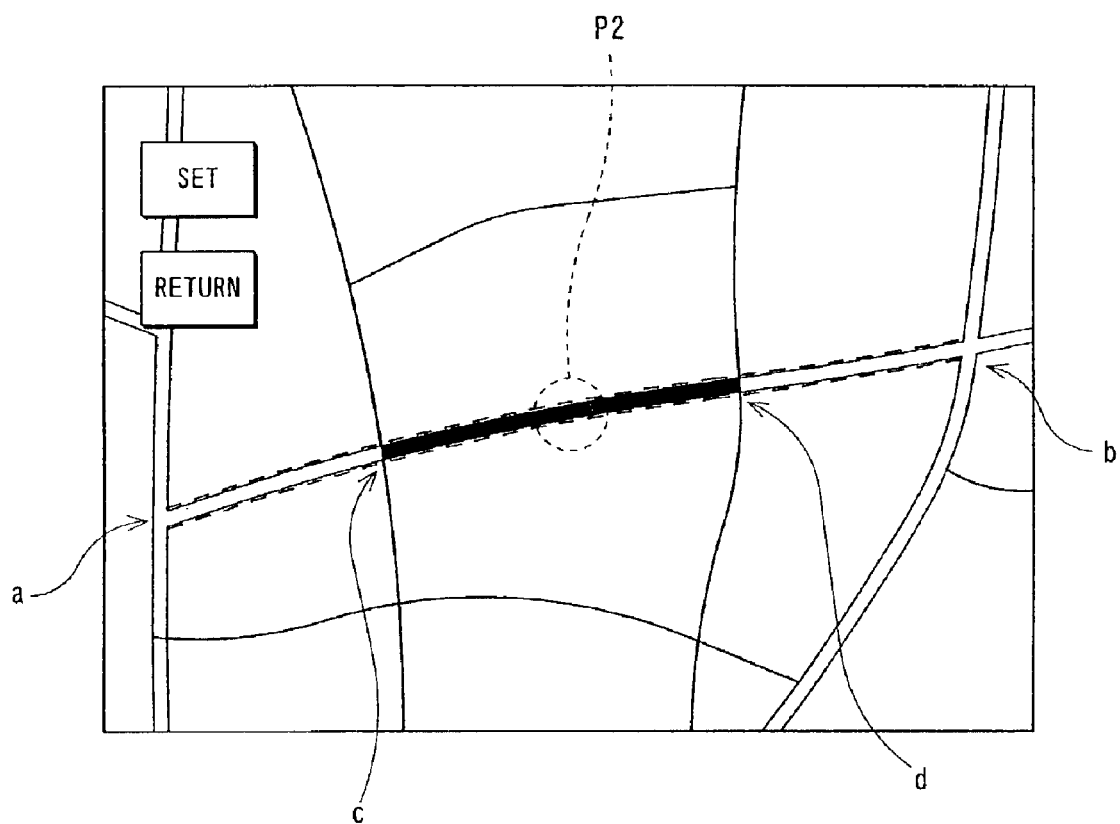
FIG. 6 is a diagram showing another example of the display of a map image when setting the avoidance road.
Figure 7:
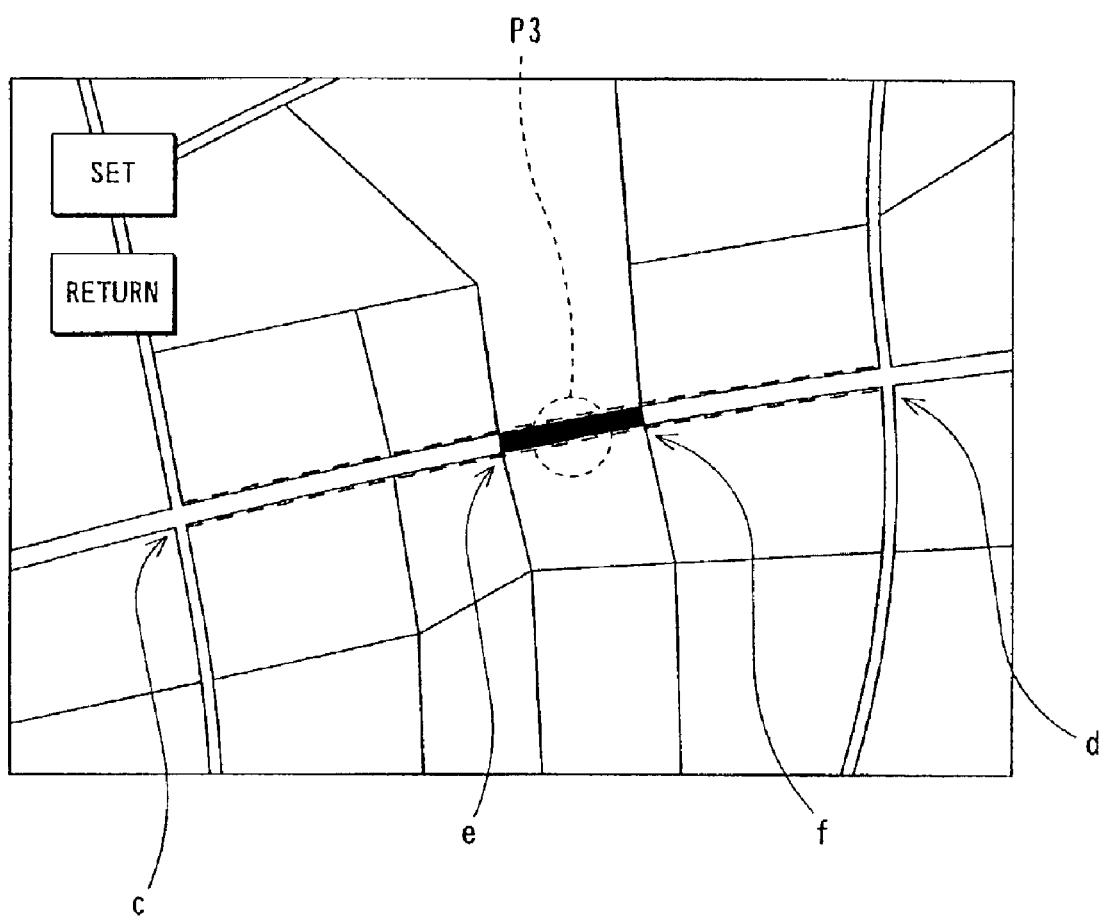
FIG. 7 is a diagram showing another example of the display of a map image when setting the avoidance road.

FIGS. 5 to 7 each show examples of the map images displayed upon setting the avoidance roads.

FIG. 5 shows an example of the map image displayed in a relatively small reduced scale. In the map image as shown in FIG. 5, there are displayed main roads especially including expressways, national roads, and the like. On the upper left side of the screen, the SET button 100 is displayed to enter an instruction for setting the avoidance road.

In such a map image displayed, in a case where the user designates a position P1 (in this figure, the position enclosed by a dotted line) by using the touch panel 7, a road between an intersection "a" and an intersection "b" is selected as the avoidance road, and then a link corresponding to the road is specified. This road, which is specified as the avoidance road, is not set as the avoidance road yet, but is in a temporarily selected condition.

After the avoidance road is selected, as shown in FIG. 6, another map image, namely, a detailed area map image covering the selected road and its surroundings, is displayed in a reduced scale by a predetermined value larger than that previously set. As the map image is displayed in the larger reduced scale, main local roads are also displayed in addition to the expressways and the national roads. The avoidance road in the temporarily selected condition (that is, the road between the intersections "a" and "b") is highlighted by proper markings. In this figure, for convenience, the avoidance road is highlighted by dotted lines each of which is drawn along the corresponding side of the avoidance road. This kind of highlighting facilitates distinguishing the selected road from the other roads.

When this map image is displayed, in a case where the user further designates a position P2 by use of the touch panel 7, a road between intersections "c" and "d" is selected as the revised avoidance road, and a link corresponding to the road is specified. The road re-selected as the avoidance road is highlighted by flashing or the like. In this figure, for convenience, the area of the avoidance road is highlighted by being filled with a black color. As described above, the reselected road is displayed in such a manner that it is distinguishable from the road previously selected and from the other roads displayed, to thereby facilitate understanding the selected condition of the road. This road which is specified as the revised avoidance road, is not set as the avoidance road yet, but is in a temporarily selected condition.

After the above revised avoidance road is selected, another map image is displayed as shown in FIG. 7, namely, a detailed area map image covering the above re-selected road and its surroundings in a reduced scale by a prescribed value much larger than that previously set. As the map image is displayed in the much larger reduced scale, general roads are also displayed in addition to the expressways, the national roads, and the main local roads. The avoidance road between intersections "c" and "d" in the temporarily selected condition is highlighted by a specific display. In this figure, for convenience, the avoidance road is highlighted by dotted lines each of which is drawn along the corresponding side of the avoidance road.

When this map image is displayed, in a case where the user further designates a position P3 by use of the touch panel 7, a road between intersections "e" and "f" is selected as the revised avoidance road, and a link corresponding to the road is specified. The road re-selected as the avoidance road is highlighted by flashing or the like. In this figure, for convenience, the revised avoidance road is filled with a black color. If the user provides an instruction to set this avoidance road in the temporarily selected condition as the predetermined one, the road between the intersections "e" and "f" is finally set as the formal avoidance road, and a link ID of the link corresponding to this road is stored in the avoidance-road memory 24.

If the user would like to set the road between the intersections "c" and "d" as the avoidance road, he or she should not designate the above position P3 in the map image of FIG. 7, and has only to provide an instruction to set the avoidance road when the road between the intersections "c" and "d" is in the temporarily selected condition. In this case, based on a specific level (for example, "level 2") of the road unit responsive to the reduced scale of the map image, one link relating to the road between the intersections "c" and "d" is specified. Simultaneously, based on the lower levels (for example, "level 0" and "level 1") of the road units, a plurality of links corresponding to the road between the intersections "c" and "d" is specified. Theses links, namely, the above-mentioned one link and the plurality of links are stored in the avoidance-road memory 24.

Similarly, if the user would like to set the road between the intersections "a" and "b" as the avoidance road, he or she should not designate the above position P2 in the map image of FIG. 6, and has only to provide an instruction to set the avoidance road when the road between the intersections "a" and "b" is in the temporarily selected condition. In this case, based on a specific level (for example, "level 3") of the road unit responsive to the reduced scale of the map image, one link relating to the road between the intersections "a" and "b" is specified. Simultaneously, based on the lower levels (for example, "level 0" to "level 2") of the road units, a plurality of links corresponding to the road between the intersections "a" and "b" is specified. Theses links, namely, the above-mentioned one link and the plurality of links are stored in the avoidance-road memory 24.

FIG. 8 is a diagram showing one example of the contents of data stored in the avoidance-road memory 24. As shown in FIG. 8, the link IDs associated with the avoidance roads are stored together with registered dates thereof in the avoidance-road memory 24. Also, in each link ID is stored the additional information set as desired by the user. For example, the link ID "Ln 20" stores the "registered date" indicating the registration as of Jun. 25, 2001, and the "additional information (text information)" indicating " . . . STREET (UNDER CONGESTION)". This additional information may be set concurrently with the storage of the link ID into the avoidance-road memory 24, or may be set in an arbitrary editing operation after the storage of the link ID. Since the registered date of each link ID is stored, it is possible to easily understand the date when the link ID is set. In a case where a prescribed time period (for example, three months) has passed since a link ID was registered, the navigation controller 1 may be designed to inform the user of the link ID, or to instruct the user to cancel the link ID which does not need to be in a registered state.

As described above, since additional information is also stored relating to each link ID, it facilitates understanding the contents of the link IDs when performing the editing operation after the registration of the link ID. For instance, according to the additional information associated with the above link ID "Ln 20", the user can understand with ease the past fact that since a specific section of "○○ STREET" was constantly congested, the section of the road was set as the avoidance road. Similarly, according to the addition information associated with the above link ID "Ln 55", the user can understand with ease the past fact that since a specific section of the "○△ MAIN ROAD" was under construction, the section of the road was set as the avoidance road.

Next, the operation of the navigation device when performing a route search considering the set avoidance road will be described.

Figure 9:
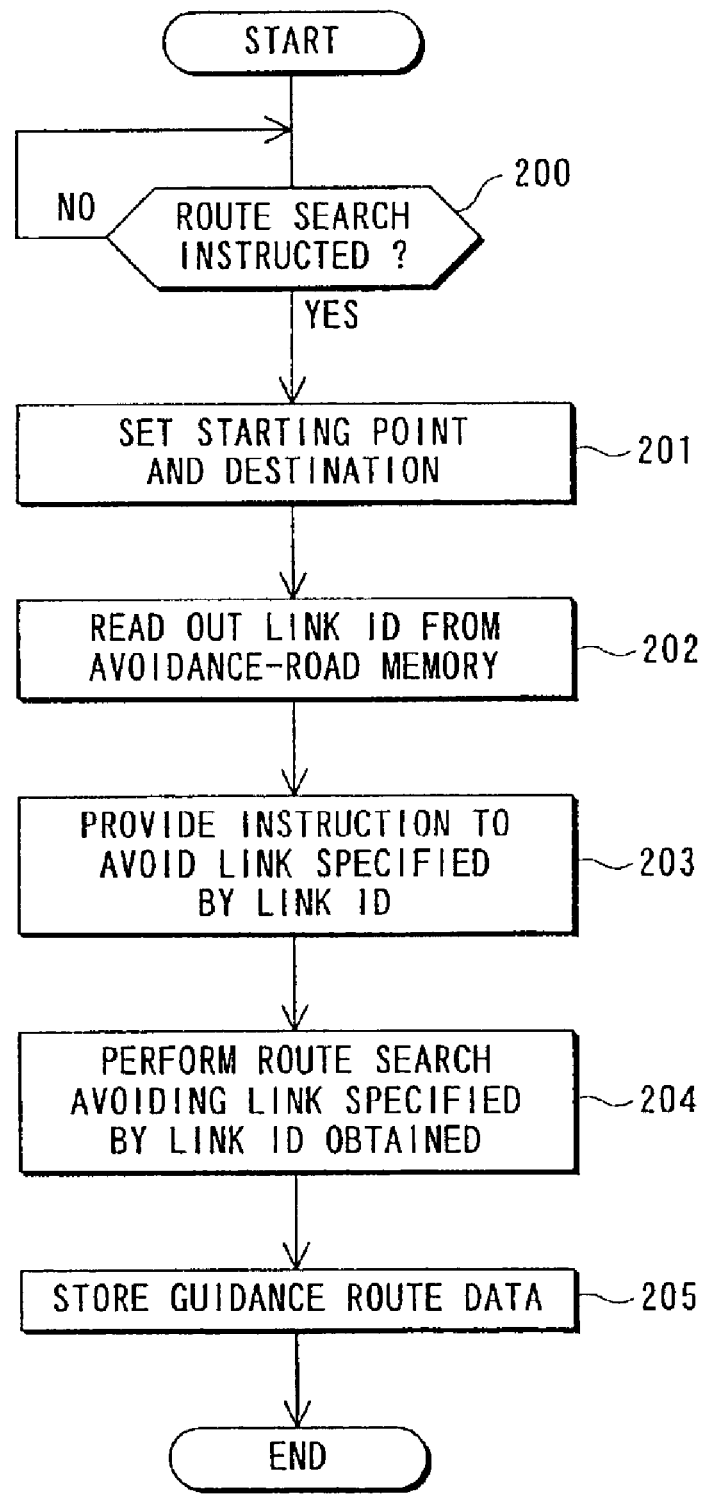
FIG. 9 is a flow chart showing the operation of the navigation device when performing a route search considering the avoidance road.

FIG. 9 is a flow chart showing the operation of the navigation device when searching for a guidance route in consideration of the avoidance road.

The route search processor 28 determines whether or not the user provides an instruction to perform a route search (step 200). If no instruction is provided, the processing in step 200 is repeated.

When an instruction to perform a route search is provided, an affirmative determination is made in step 200, and the route search processor 28 sets a starting point based on the present vehicle position at that time, and a destination based on the user's instruction (step 201).

The avoidance-road setting unit 22 reads out the link ID stored in the avoidance-road memory 24 (step 202), to instruct the route search processor 28 to set the link specified by the link ID as one to be avoided (step 203).

The route search processor 28 carries out the route search for a guidance traveling route from the starting point to the destination which bypasses the link specified by the link ID obtained from the avoidance-road setting unit 22 (step 204).

Finally, the route search processor 28 stores in the guidance route memory 30 the guidance route data indicating the contents of the guidance traveling route previously searched for (step 205), to end the route search processing.

As mentioned above, the navigation device of the present embodiment, when an arbitrary road in the displayed map image is designated, variably sets a range of the road to be selected from the overall designated road in accordance with the reduced scale of the map image, thereby easily designating the avoidance road or section with high accuracy. Also, according to the navigation device, the road selected as the avoidance one is stored in the avoidance-road memory 24, so that in future navigating operations only the readout of the stored road is needed to designate the avoidance road or section, thus simplifying the navigating operation.

In particular, after any one of the roads is selected, the detailed area map image is displayed in the reduced scale larger than that set at the time of the selection. And when the repeated designating operation of the road is performed, a selecting operation of the detailed road or section is carried out based on the road section previously selected. Therefore, when setting the avoidance range of the road in detail, the user does not need to adjust the reduced scale of the map and the display area thereof, thus improving the operability of the navigation device.

The described embodiments of the invention are only considered to be preferred and illustrative of the inventive concept, and the scope of the invention is not restricted to such embodiments. Various other arrangements may be devised by one skilled in the art without departing from the spirit and scope of this invention. For example, although in the above embodiment the road is specified by link, the road may be specified by another predetermined unit, such as the interval between the interchanges on an expressway, the interval between the intersections on a national road, or the interval between the intersections on any other road including a local road, the general road. Preferably, this predetermined unit which specifies the range of the road is set in accordance with the reduced scale of the map image. More specifically, in the map image displayed on the small reduced scale (the wide area display) the road or section may be specified by the road unit such as "MAIN ROAD", "STREET", or "EXPRESSWAY", while in the map image displayed on the large reduced scale (the detailed area display) the road or section may be specified by the interval between the intersections or the interchanges.

FIG. 10 shows diagrams of variant examples indicating the process of designating the road by the predetermined unit other than the link. In the following, an expressway is given as an example, and the contents of the processing will be described that is performed when adjusting and specifying the avoidance range of the road responsive to the reduced scale of the map image.

Figure 10A:
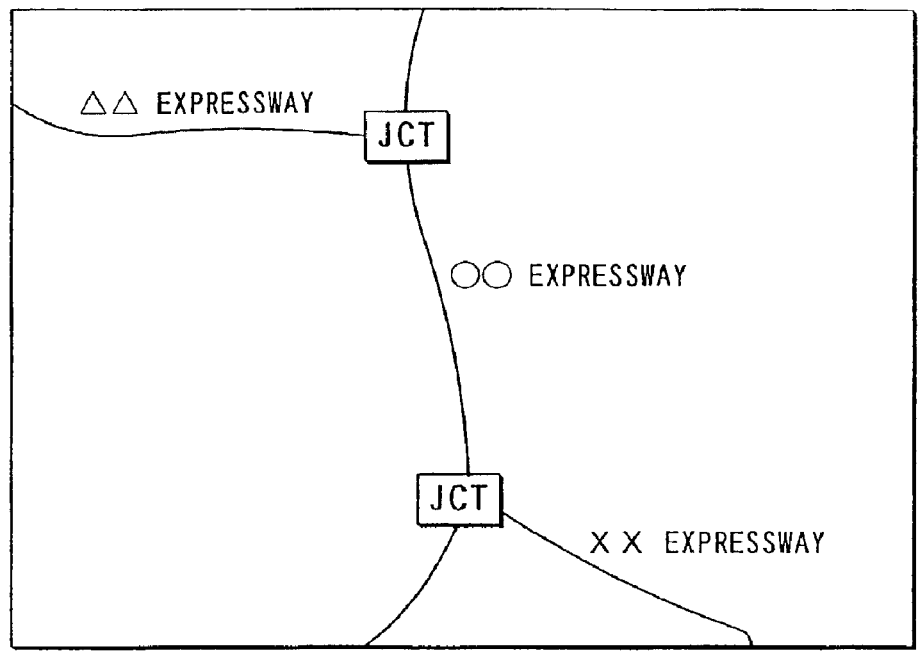
FIGS. 10A–B is a diagram of a different example illustrating the process of designating an avoidance road by a predetermined unit other than a link.

FIG. 10(A) shows an example of the display of the map image in a case where its reduced scale is smaller than a predetermined value. In this example, the reduced scale is set to the so-called "10 km scale" or more, in which 1 cm on the screen corresponds to 10 km on the ground. In the wide-area map image of FIG. 10(A), the entire expressway such as "○○ EXPRESSWAY", or "△△ EXPRESSWAY" is to be selected as the avoidance road in compliance with the user's instruction.

Figure 10B:
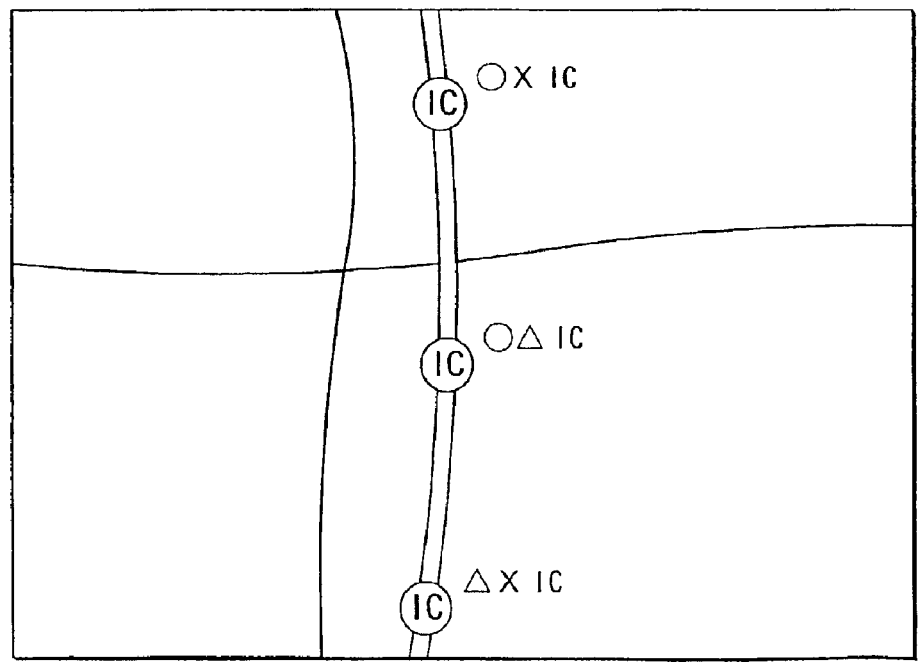

FIG. 10(B) shows an example of the display of the map image in a case where its reduced scale is larger than the predetermined value. In this example, the reduced scale is set to less than the so-called "10 km scale". In the relatively detailed map image of FIG. 10(B), a range or section of the road which corresponds to the interval between the interchanges of the expressway is to be selected as the avoidance section in compliance with the user's instruction. As shown in FIG. 10(B), for example, the interval between the "○x interchange (IC)" and the "○△ interchange (IC)", or the interval between the "○△ interchange (IC)" and the "△x" interchange (IC)" is to be selected. It is noted that the above-mentioned symbols "○x△" can be replaced by the actual names of the interchanges.

Figure 11A:
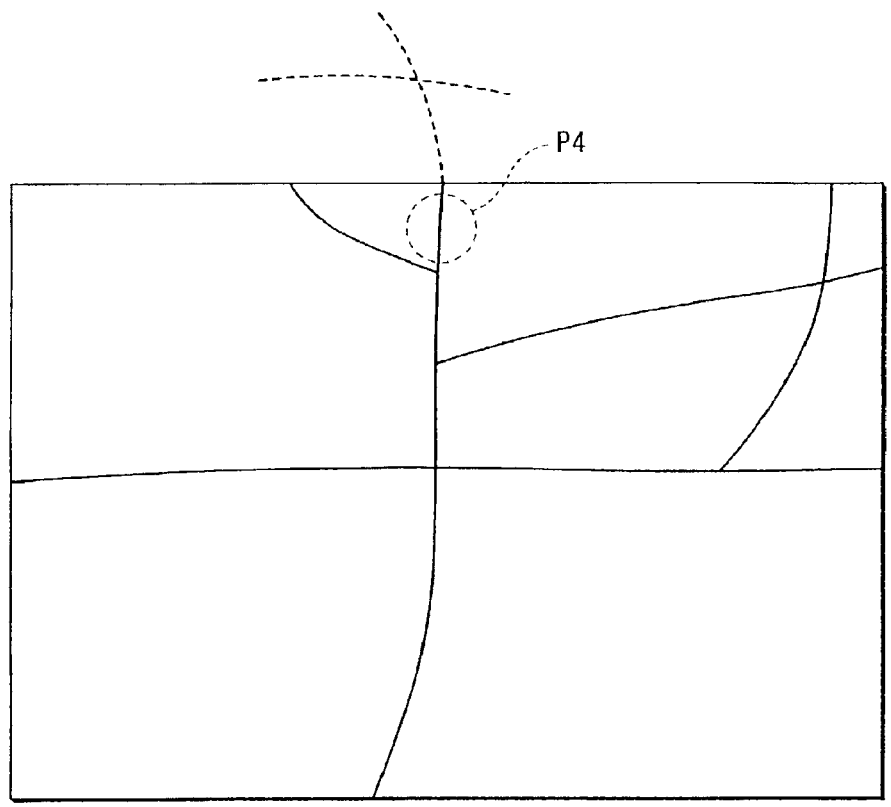
FIGS. 11A–B is a diagram showing a process in which the map image is redrawn so as to cover the full range of a selected road in a display area.
Figure 11B:
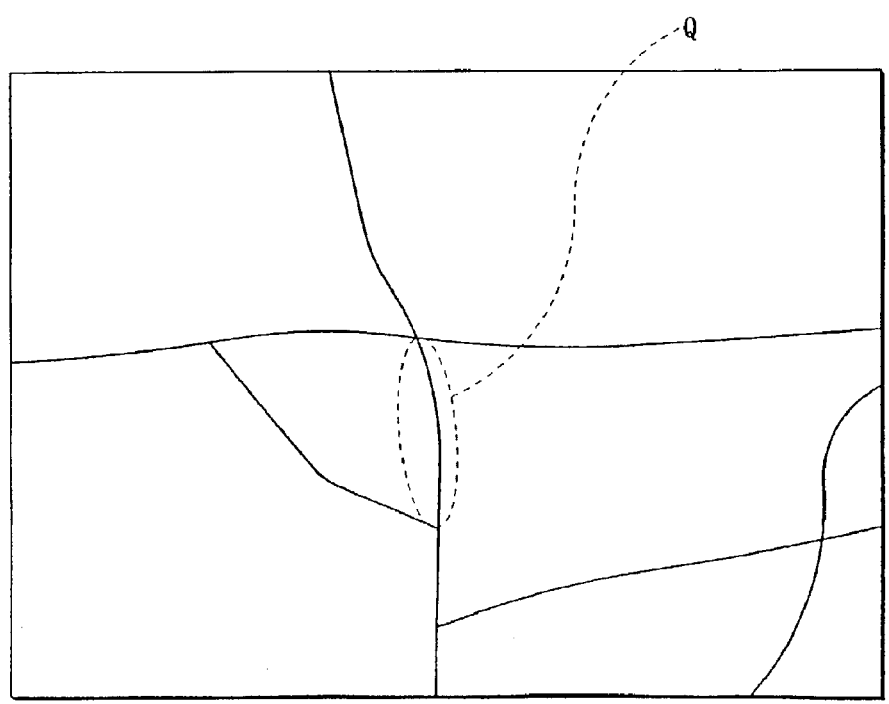

In a case where the road corresponding to one link selected by the user's instruction lies outside the display area of the map image, the map image may be re-drawn such that the full range of the selected road is within the display area. FIG. 11 is a diagram showing the process in which the map image is drawn over again so as to cover the full range of the selected road in the display area. When a part of the road corresponding to the link specified based on a position P4, which is designated by the user (in this figure, the range enclosed by a dotted line), is outside the display area of the map image as shown in FIG. 11(A), the map drawing unit 14 re-draws the map image so as to include the full range Q of the selected road in the display area of the map image as shown in FIG. 11(B). Thus, the map image is re-drawn and re-displayed so as to contain the full range of the selected road in the display area, to thereby facilitate understanding the full range of the selected road.

In the above embodiment, when the road to be avoided is designated on the map, the detailed area map image whose reduced scale is set larger is automatically displayed. However, the invention is not restricted to this embodiment, and the process of changing the reduced scale may be manually performed.

In the above embodiment, when storing the avoidance road in the avoidance-road memory 24, the additional information is set based on the user's arbitrary instruction. The invention, however, is not restricted to this embodiment, and the contents of the additional information may be automatically set, thereby improving the operability of the navigation device. For example, based on the link extracted as the avoidance road, the information on the type and the location of the road may be automatically extracted, and then the additional information, for example, "National Road Route No . . . ", or "3- . . . Town" may be automatically provided.

In the above embodiments, the touch panel 7 is mainly used to designate the avoidance road, but the instruction may be carried out by use of the remote control unit 4. In this case, by moving a cursor (cursor mark) displayed on the screen to a desired location on the map in compliance with the instruction provided by the remote control unit 4, the location corresponding to the cursor, or the road existing near the location, may be specified as the avoidance road or section.

The map data disclosed in the above embodiment includes a drawing unit composed of a "level 0" to "level 9" levels, and a road unit composed of the "level 0" to "level 3" levels, but the number of levels included in the drawing unit and the road unit is not restricted to this embodiment.

As described above, according to the present invention, when designating an arbitrary road included in the displayed map image, a range of the road to be selected from the entire designated road can be variably set in accordance with the reduced scale, thereby easily designating the avoidance road or section with high accuracy.

What is claimed is:

1. A navigation device comprising:
   map drawing means for drawing a map image in one of a plurality of predetermined reduced scales;
   a display unit for displaying the map image drawn by said map drawing means;
   designation means for designating an arbitrary road which is included in said map image displayed by the display unit in accordance with a user's operation; and
   road selection means for variably setting a section of the road designated by said designation means in accordance with said reduced scale to select said set section of the road;
   wherein when a first map image in one of the reduced scales is displayed, the user can designate a section of a road included in the first map image, and if the designated road section is not set by the user using the road selection means, a second map image in a larger reduced scale is displayed and includes said designated road section, thereby allowing the user to designate a smaller portion of the road section than was designated in the first map image.

2. The navigation device according to claim 1, further comprising selected-road storage means for storing said section of the road selected by said road selection means, together with a date of the setting.

3. The navigation device according to claim 1, further comprising selected-road storage means for storing said section of the road selected by said road selection means, together with additional information entered by the user.

4. The navigation device according to claim 1, further comprising route search means for searching for an optimal travel route between a predetermined starting point and a destination, and avoidance setting means for setting the section of the road selected by said road selection means as one to be avoided when said route search means performs the route search.

5. The navigation device according to claim 4, wherein, as to roads which are respectively included in a plurality of map images responsive to a plurality of reduced scales, the roads being identical to one another, the road in a map image having a smaller reduced scale corresponds to a longer link, while the identical road in a map image having a larger reduced scale corresponds to smaller links into which the longer link is divided, and wherein, when said designation means designates a road in the map image having any one of the reduced scales, said avoidance setting means sets a first link corresponding to the designated road, and a plurality of second links corresponding to said first link in a map image having a larger reduced scale, as avoidance links of interest.

6. The navigation device according to any one of claims 4 and 5, wherein, in a case where a part of said section of the road selected by said road selection means lies outside a display area displayed by said display unit, said map drawing means redraws the map image such that a full range of the selected section of the road is within the display area.

7. The navigation device according to any one of claims 4 and 5, wherein said map drawing means draws the section of the road selected by said road selection means in such a manner that said section of the road is distinguishable from the other roads displayed.

8. The navigation device according to any one of claims 4 and 5, wherein said map drawing means draws a detailed area map image in a reduced scale larger than the reduced scale that is set when said road selection means selects any one of the roads, and wherein, when said designation means carries out a repeated designation of a road, said road selection means performs a selecting operation of a detailed road, based on the road that has been already selected.

9. The navigation device according to any one of claims 4 and 5, wherein, when said road selection means repeatedly performs a plurality of selecting operations of the road sections, said map drawing means draws each of the sections of the roads selected by the respective selecting processes in such a manner that said sections of the roads are distinguishable from one another and from the other roads displayed.

10. The navigation device according to any one of claims 4 and 5, wherein, when said designation means designates an expressway, said road selection means selects the entire designated expressway in a case where the reduced scale is smaller than a predetermined value, and partially selects a section of the expressway, with an interval from one interchange of the designated expressway to another as one unit, in a case where the reduced scale is larger than a predetermined value.

11. A method of operating a vehicle navigation device, comprising:
    providing map data for drawing a map image in a plurality of reduced scales;
    displaying a first map image in one of the reduced scales;
    receiving from a user a designation of a road included in the displayed first map image;
    receiving from the user an instruction to set the designated road in the first map image or, if the user does not provide such a setting instruction, displaying a second map image including the designated road in a larger reduced scale, thereby allowing the user to designate a smaller portion of the road than was designated in the first map image.

12. A method according to claim 11, further comprising:
    storing said section of the designated road, together with at least one of a date of setting the road section and additional information entered by the user.

13. A method according to claim 11, further comprising:

searching for a travel route between a predetermined starting point and a destination while avoiding said section of the designated road.

14. A method according to claim 13, wherein for a road included in a map image at a plurality of reduced scales, the road is formed of relatively longer first links at a smaller reduced scale and is formed of relatively shorter second links at a larger reduced scale; said section of the designated road corresponds to a number of first links of the road at the smaller reduced scale that is smaller than the number of second links of the road at the larger reduced scale.

15. A method according to claim 13, further comprising:

if said section of the designated road lies partly outside the displayed map image, automatically redrawing the map image so that the entire section of the designated road is displayed.

16. A method according to claim 13, wherein said section of the designated road is displayed in a manner so that said section is visually distinguishable from the other roads displayed.

* * * * *